US008280962B2

(12) United States Patent
Muniz et al.

(10) Patent No.: US 8,280,962 B2
(45) Date of Patent: *Oct. 2, 2012

(54) SERVICE COMMUNICATION LIST

(75) Inventors: Kelly Muniz, Morgan Hill, CA (US);
Heeral Roy, Pleasanton, CA (US);
Alison Ruge, Oakland, CA (US); Mark Oliver, Los Gatos, CA (US); David Butt, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 473 days.

This patent is subject to a terminal disclaimer.

(21) Appl. No.: 12/099,654

(22) Filed: Apr. 8, 2008

(65) Prior Publication Data

US 2009/0252312 A1 Oct. 8, 2009

(51) Int. Cl.
*G06F 15/16* (2006.01)
(52) U.S. Cl. ......... 709/206; 709/204; 709/205; 709/207
(58) Field of Classification Search ........... 709/204–207
See application file for complete search history.

(56) References Cited

U.S. PATENT DOCUMENTS

| | | | |
|---|---|---|---|
| 2005/0097440 A1 | 5/2005 | Lusk et al. | |
| 2005/0105374 A1* | 5/2005 | Finke-Anlauff et al. | 365/232 |
| 2005/0254481 A1* | 11/2005 | Vishik et al. | 370/352 |
| 2006/0195474 A1* | 8/2006 | Cadiz et al. | 707/104.1 |
| 2007/0016646 A1* | 1/2007 | Tendjoukian et al. | 709/206 |
| 2007/0061712 A1* | 3/2007 | Bodin et al. | 715/523 |
| 2008/0065446 A1* | 3/2008 | Haveliwala et al. | 705/8 |
| 2008/0120555 A1* | 5/2008 | McMahan et al. | 715/748 |
| 2009/0037407 A1* | 2/2009 | Yang et al. | 707/5 |
| 2009/0210494 A1* | 8/2009 | Fisher et al. | 709/205 |

OTHER PUBLICATIONS

Non-Final Office Action dated May 21, 2010 cited in U.S. Appl. No. 12/099,677.
Non-Final Office Action dated Sep. 9, 2010 cited in U.S. Appl. No. 12/099,677.
Non-Final Office Action dated Feb. 14, 2011 cited in U.S. Appl. No. 12/099,677.
http://www.xobni.com, 4 pages (printed Aug. 11, 2008).
http://www.group2call.com/site/index.php/how-it-works.html, 3 pages (printed Aug. 11, 2008).
http:/messenger.yahoo.com/feat_voice.php, 1 page (printed Aug. 11, 2008).
Final Office Action dated Aug. 1, 2011 cited in U.S. Appl. No. 12/099,677.

* cited by examiner

*Primary Examiner* — Hieu Hoang
(74) *Attorney, Agent, or Firm* — Brinks, Hofer, Gilson & Lione

(57) ABSTRACT

A method for displaying communication events is provided. The method includes collecting past, present, and future communication events from two or more communication services, where a communication device performs the collecting; combining the past, present, and future communication events into a communication events list, where the communication device performs the combining; and displaying the communication events list, such that past, present, and future communication events may be viewed, where the communication events list is displayed on the communication device.

19 Claims, 5 Drawing Sheets

| All | Meetings | Voice Messages | Instant Messages | Calls | | | Jump to 9/21/2 |
|---|---|---|---|---|---|---|---|
| Type | Name | | Subject | Date | Duration | Location | Status |
| | Connie Tang, Jeff Smith, Venka... | | Raphael UI review 2 | Tomorrow, 9:30AM | 1 hr. | | Not Started |
| Today | | | | | | | |
| | Connie Tang, Jeff Smith, Venka... | | Raphael UI review | Today, 12:00 AM | 1 hr. | Koi | |
| | Ruben Rohde | | Are you coming to the... | Today, 11:40 AM | | | Active |
| | Mark Oliver | | | Today, 11:35 AM | ... | ID:123456 | Active |
| | Kelly Muniz | | Do you have a moment? | Today, 11:15 AM | ... | | Active |
| | Cordell Ratzlaff, Mark Oliver... | | Staff meeting | Today, 10:00 AM | 1 hr. | ID:123456 | Ended |
| | Ruben Rohde | | | Today, 7:30 PM | 2 min | Rainbow Trout | |
| Yesterday | | | | | | | |

FIGURE 2

| View: | ALL | | | | | Search |
|---|---|---|---|---|---|---|
| Type | From | Subject | | Date | Duration | Notes |
| Today | | | | | | |
| | Karen Taylor | Polar Express | | 2:00pm | | |
| | Karen Taylor | UI Sketches | | 2:00pm | 20 min | Make tabs instead of... |
| | Karen Taylor | Personas | | 1:45pm | 20 min | |
| | Smith Kales | Demo Feedback | | 1:40pm | | Speak to Karen about... |
| | Tom Wales | Personas | | 1:00pm | 20 min | add International, add... |
| | Jason Long | UI guidelines | | 12:00pm | | |
| | Karen Taylor | Personas | | 12:00pm | | Create preso for the... |
| | Karen Taylor | Personas | | 11:30am | | Follow up with Smith |
| | Margaret | Personas | | 11:16am | | |
| | David Lotts | Polar Express PRD | | 10:00am | | The most successful fe... |
| | Smith Kales | Demo Feedback | | 9:45am | 15 min | Review and send |
| | Tony Fong | Green Card 1-49 | | 9:30am | | |
| | Karen Taylor | Personas | | 9:30am | | add International, add... |
| | David Lotts | Personas | | 9:20am | | |

Communication Details
Reply | Forward | Delete
From: Karen Taylor
Subject: UI Sketches
uisketches.pdf

FIGURE 3

SERVICE COMMUNICATION LIST

BACKGROUND

The present embodiments relate to a service communication list.

A service communication list is a listing of service communication events associated with a communication device. For example, a service communication event may occur when service is transmitted to and/or from a communication device. A service communication list may be used to manage service communication events.

BRIEF DESCRIPTION OF THE DRAWINGS

FIG. 2 illustrates one embodiment of an event communication list.

FIG. 3 illustrates another embodiment of a communication event list.

DETAILED DESCRIPTION

The present embodiments relate to a service communication list that includes past, present, and future communication events from two or more services.

In one aspect, a method for displaying communication events is provided. The method includes collecting past, present, and future communication events from two or more communication services, where a communication device performs the collecting; combining the past, present, and future communication events into a communication events list, where the communication device performs the combining; and displaying the communication events list, such that past, present, and future communication events may be viewed, where the communication events list is displayed on the communication device.

In a second aspect, a communication device for displaying communication events is provided. The communication system includes a display device and a processor. The processor is operable to combine communication events from two or more communication services into a communication events list, where the communication events are past, present, or future communication events. The communication events list is displayed on the display device, such that communication events are viewable on the display device.

In a third aspect, computer readable storage media with instructions for generating a communication event list is provided. The instructions include receiving past, present, and future communication events from two or more communication services; combining the past, present, and future communication events into a communication events list; and displaying the communication events list, such that past, present, and future communication events may be viewed, where the communication events list is displayed on the communication device.

Figure 1:
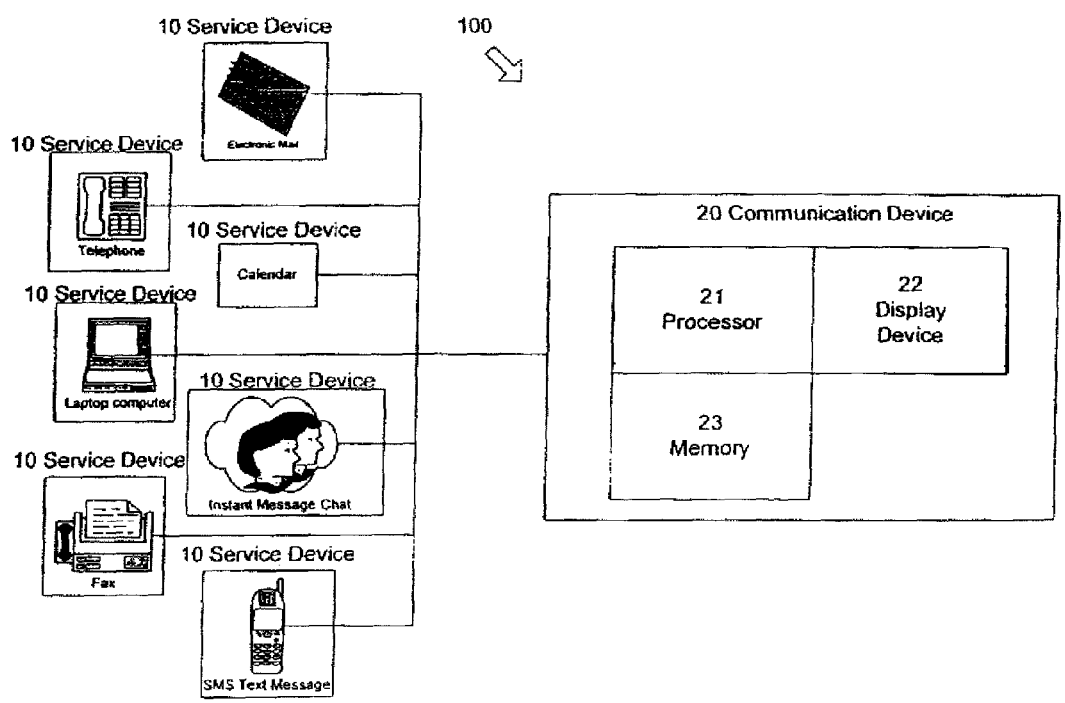
FIG. 1 illustrates one embodiment of a communication system.

FIG. 1 shows a communication system 100 that includes a service device 10 and a communication device 20. Additional, different, or fewer components may be provided. For example, the system 100 may include a plurality of service devices 10 and/or communication devices 20. In another example, the system 100 does not include a service device 10.

The system 100 is a network, communication system, or any other system for providing communication services. The service device 10 is an email server, instant message server, short message service (SMS) server, exchange server, telephone server, router, private branch exchange (PBX) device, endpoint device, or any other now known or later developed device for providing and/or receiving a communication service.

The service device 10 may provide a service to the communication device 20. A communication service may include telephone service, electronic mail service, instant message service, SMS, voice mail service, meeting service, calendar service, any combination thereof, or any now known or later developed communication service. A communication device 20 may be associated with or registered for one or more services. For example, a communication device 20 may be registered to receive telephone service from a first service device and electronic mail service from a different service device.

The service device 10 may communicate with the communication device 20. Communication may include providing the communication device 20 with the service. The communication may be direct or indirect. The communication device 20 may communicate directly with the service device 10 using a protocol, telephone line, wireless device, wire (cable), any combination thereof, or any other now known or later developed communication technique. The communication device 20 may communicate with a plurality of service devices 10 providing different and/or the same services.

The communication device 20 may include a processor 21, display device 22, and memory 23. Additional, different, or fewer components may be provided. For example, the communication device 20 may include an input device, such as a keyboard, mouse, or microphone. In another example, processing may occur remotely, such that the communication device 20 includes only a display device 22.

The communication device 20 is a personal computer, laptop computer, remote terminal device, cellular telephone, personal digital assistant (PDA), handheld device, portable device, camera, music player, or other now known or later developed communication device. The communication device 20 provides automatic and/or manual management of one or more communication services. For example, the communication device 20 may be a computer that automatically displays descriptions of past, present, and future communication events in a single list. In another example, the communication device 20 automatically updates a communication event list, such as updating a call log.

The processor 21 is a general processor, digital signal processor, application specific integrated circuit, field programmable gate array, analog circuit, digital circuit, combinations thereof, or other now known or later developed processors. The processor 21 may be single devices or combinations of devices, such as associated with a network or distributed processing. Any of various processing strategies may be used, such as multi-processing, multi-tasking, parallel processing, remote processing, or the like. The processor 21 is responsive to instructions stored as part of software, hardware, integrated circuits, firmware, micro-code or the like.

The processor 21 is operable to transmit and/or receive communication event information. A communication event is a telephone call, electronic mail message, instant message, short text message, voice message, voice recording, document update, meeting, message, calendar event, any combination thereof, or any now known or later developed communication event. Additional, different, or fewer communication events may be provided. For example, a communication event may occur when a service or communication is transmitted to, used by, and/or received by the communication device 20. Alternatively, a communication event may occur when a service is provided to another communication device. For example, a communication event may occur when two communication devices use a PBX device to communicate. A communication event may be any type of media mode, such as audio, video, textual, or graphical. For example, a message may be a video message, audio message, textual message, or graphical message. In another example, a meeting may be a video meeting.

A communication event may be a past, present, or future communication event. The event occurs as part of providing the service. For example, a phone service is provided. Each call or message provided using the service is an event.

A past communication event is a communication event that has began and ended. Past communication events are completed before the present time that the communication device 20 is being used. For example, an email that was received during a time period before a user checks the communication device 20 is a past communication event. The log of past communication events may be archived or stored in memory 23 or a record of the past communication event. In another example, a meeting that has already taken place (e.g., ended) is a past communication event. Notification of a future meeting where the notification has been completed is a past communication event.

A present communication event is a communication event that is currently taking place, such as active or pending communication events. A present communication event is an event that has begun, but has not ended. For example, an email that a user is in the process of drafting may be considered a present communication event. After the email is sent, the email may be considered a past communication event. In another example, a meeting that is taking place (e.g., begun, but not ended) may be a present communication event. During the meeting, the meeting is a present communication event because the meeting is active.

A future communication event is a communication event that is going to take place in the future. A future communication event is an event that has not begun and/or ended. For example, a meeting scheduled in the future (e.g., the next minute, the next hour, the next day, the next year) is a future communication event.

The processor 21 may identify communication event information. Communication event information is information that describes the communication event. Identification may include retrieving, receiving, or generating unique or label information. Additional, different, or fewer ways of identifying communication event information may be provided. Identification may occur before, during, or after a communication event. Communication event information may include information relating to past, present, and/or future communication events.

The processor 21 may retrieve communication event information. Retrieving may include gathering, exacting, searching, spidering, or web crawling communication event information from one or more sources. For example, communication event information may be identified as being stored at a remote location. The processor 21 may then request the communication event information. In another example, the processor 21 may send a request to a remote location requesting communication event information associated with a client device 20. The communication event information may be transmitted to the communication device 20. The processor 21 may then identify the communication event information.

The processor 21 may receive communication event information from one or more service devices 20. Communication event information may be directly or indirectly received from the service device 10. Communication event information may be received in response to a request (e.g., sent by the communication device 20), periodically, continually, as a rule, or upon the occurrence of a stated event. For example, the processor 21 may receive communication event information once a second, minute, hour, or day. In another example, the communication device 20 may send a request for information and accept information in response to the request.

The processor 21 is operable to generate communication events. The processor 21 may generate communication events for services with functions stored on, loaded on, installed on, or communicated to the communication device 20. For example, a calendar service may be installed on the communication device 20. The calendar service may store, track, organize, or manage events, such as meetings, reminders, dates, conferences, or other calendar related events. The processor 21 may generate communication event information from a reminder or scheduled meeting stored in the calendar service. In addition to, or as alternative to, the processor 21 generating communication events, the communication events may be generated by a system, such as a system with a server and communication event.

The processor 21 is operable to generate communication event information based on transmitted communication events. The communication device 20 may transmit information to one or more other communication devices. The transmission of information is a communication event. For example, the processor 21 may transmit an email message to a service device 10 or another communication device. In another example, the processor 21 may generate communication event information, such as calendar event information, and transmit the generated communication event to another communication device.

The processor 21 is operable to generate a communication events list 30. The communication events list 30 may include retrieved communication event information, received communication event information, generated communication event information, transmitted communication event information, or any combination thereof. Additional, different, or less information may be provided in the communication events list 30. The communication events list 30 is based on communication events.

The communication events list 30 may include past, present, and future communication event information. Communication event information may include a past, present, and future communication event description, representation, illustration, or any combination thereof. For example, in the example of FIG. 2, the communication events list may include a future communication event description 31. In another example, the communication events list may include a present communication event description 32.

The communication events list 30 may include labels. The labels may be used to organize or manage descriptions of the communication events. The labels may be interactive. For example, the labels may be changed, altered, deleted, or amended. The labels may be used to describe aspects or characteristics of the descriptions. In the example of FIG. 3, the labels are used to organize according to type, name, subject, date, duration, location, and status of the communication event. Additional, different, or fewer labels may be provided. The labels may be graphical or textual.

The communication event list 30 may or may not have a textual or other description for each communication event under the one or more labels. For example, the communication event 32 in FIG. 2, which was a telephone call, does not have a description for the subject label, duration label, or location label. The description may be graphical or textual and may indicate whether the communication was received or transmitted. For example, the type of communication event may include a graphic, such as a telephone, that describes the service provided and a representation of whether the telephone call was initiated or received.

The communication events list may include links associated with a communication event. The link may or may not be associated with the communication event. The links may be a pathway to a document, location, space, or communication. For example, a communication event may be a telephonic conference or web meeting. The communication events list may include a pathway to a telephonic meeting place or web meeting place. The link allows the user to join the meeting from the list itself when the meeting becomes active. In another example, a communication event may be an email message with an attached document. The communication events list may include a link to the attached document or the email message. In another example, the link may be a pathway for making a Voice over Internet Protocol (VoIP) call. By following the link, a VoIP call may be made.

The communication list may include a link to a document. The communication list may include text documents, spreadsheets, graphics, presentations, instant message strings, and/or audio recordings. For example, the communication list may include a text document, such as an email message. In another example, the communication list may include a string of SMS text messages sent back and forth from the communication device 20 and another communication device.

The communication list may include a global record of communication. Communication events from different medias used in communication may be included in a global record as a single entry on the list. For example, a conversation may start out with an instant message, then later escalates to a call, then later escalates to a collaboration session. Users are able to view a single global record of the communication with access to details on all medias used, such as instant message, voice, video, or collaboration.

The communication list may include a user input description, such as a note or remark. A note may provide a detail or description about the associated communication event. A note may be interactive. A note may be manually input, automatically input, changed, amended or a combination thereof. For example, a note may be changed to provide a description of the communication event, such as a telephonic meeting that may not have a subject or textual document associated with it. The description may include a description of the topics discusses or decided during the telephonic meeting, such as "decided x, y, and z."

The processor 21 may update the communication events list 30. Updating the communication events list 30 may include integrating communication event information into the communication events list 30. Integration may occur automatically or manually. For example, received communication event information may be integrated into a communication events list 30. In another example, the processor 21 may update the communication events list 30 to reflect generated communication events, such as future communication events.

The processor 21 is operable to organize the communication events list 30. Organizing the communication events list 30 may include arranging, sorting, or grouping. Additional, different, or fewer organizational techniques may be used.

The processor 21 may arrange the communication event list 30. Arranging may include putting the communication events into order or into a suitable sequence, relationship, or adjustment. The communication events may be arranged according to date, name of the person the communication event was received from or sent to, duration, location, and/or any other category. For example, the communication event list 30 may be arranged in chronological order.

The processor 21 may group communication events in a communication events list 30. The communication events may be grouped according to type, name, subject, date, duration, location, status, notes, any combination thereof, or any now known or later developed grouping technique. As shown in FIG. 2, the communication list may include tabs 34. The tabs 34 may be used to view the different groupings of communication events. For example, the "All" tab 34 may include a grouping of all the communication events. In another example, the "Meetings" tab 34 may include a grouping of all the communication events that are meetings, but not any other type of communication event. In another example, the communication events may be grouped as past communication events, present communication events, and future communication events. The communication event list may include a tab 34 for past, present, and future communication events.

The processor 21 is operable to search the communication events list 30. Searching may include searching for text or a graphic. The processor 21 may search for text or a graphic within the communication event list 30. The processor 21 may use any search algorithm to locate an input value in the communication event list 30. The processor 21 may use a lexical, list, graph, tree, or string search algorithm.

The processor 21 may search within the descriptions under each label, within the documents or links associated with the communication event, within a note or remark, or anywhere else related to the communication event list. Searching may include matching. Keywords may be matched. For example, a note associated with a telephone call may include a description of the subjects discussed during the telephone call. The processor 21 may search the remarks of the subjects discussed for a match of a keyword. In another example, the processor 21 may search for a communication event received on a certain date or from a certain user.

The processor 21 is operable to cause a communication event list to be displayed on the display device 22. The displayed communication event list may include descriptions of one or more past, present, and/or future communication events.

The processor 21 may allow a user to scroll through the communication event list. Scrolling may include scrolling to view future communication events, scrolling to view past communication events, and scrolling to view present communication events. For example, if present communication events are being displayed, the processor 21 may be instructed to display the portion of the communication events list that describes future communication events.

The processor 21 may generate a timetable. The timetable may be based upon all, some, or none of the communication event information used to determine the communication event list. A timetable is a schedule showing a planned order or sequence of the communication events. The processor 21 may generate a timetable that sets out in tabular form the time at which the communication events are planned to take place, will take place, or did take place. The timetable may include the information, documents, links, and notes that are provided in the communication event list. For example, as shown in FIG. 4, the timetable may include a link 42 to a remotely stored or attached document.

Figure 4:
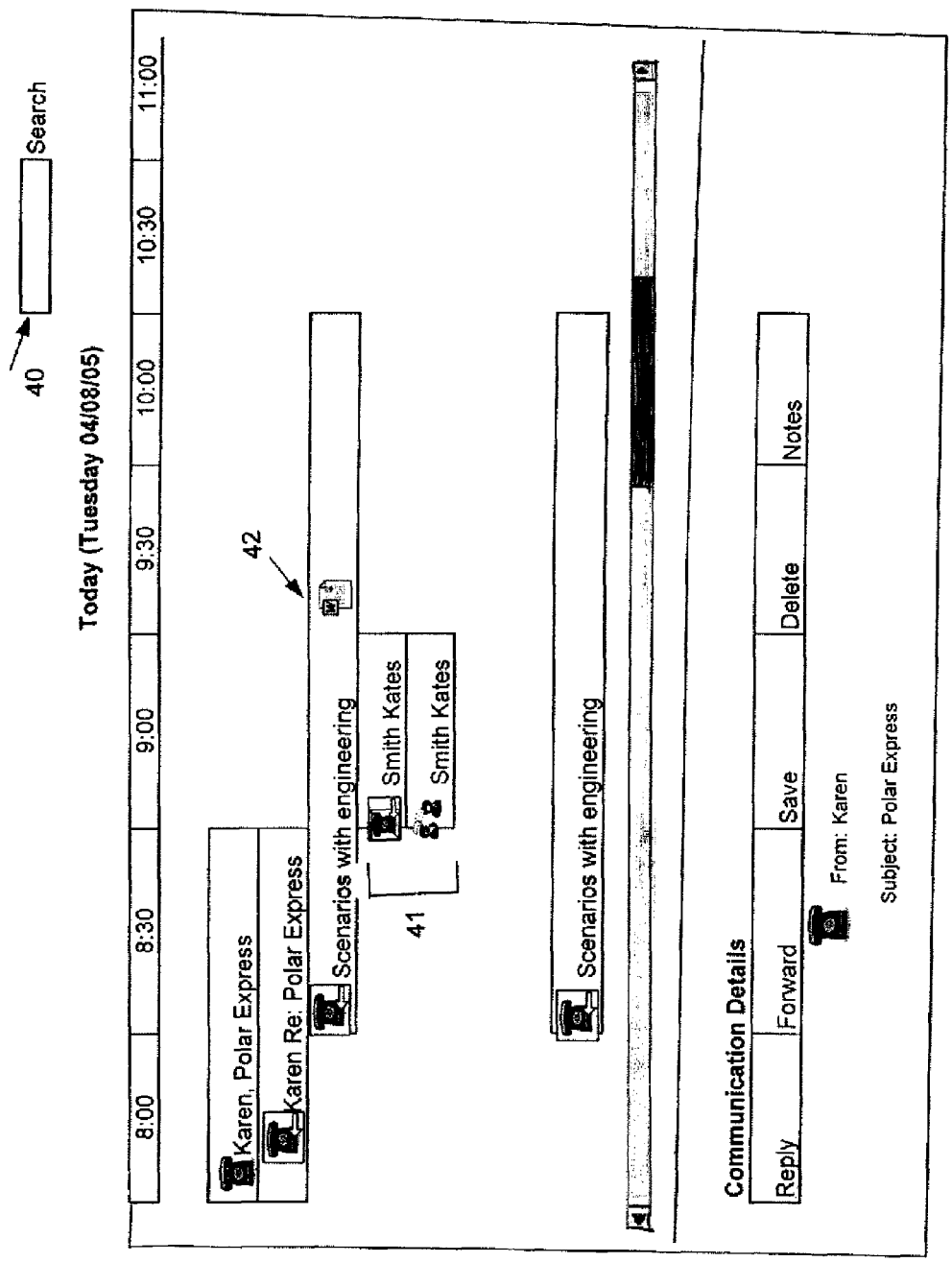
FIG. 4 illustrates one embodiment of a timetable of communication events.

As shown in FIG. 4, the timetable may include past communication events, present communication events, future communication events, or a combination thereof. The timetable may be displayed on the display device 22. The timetable may be linear and display communication history for an associated user, group, or device. For example, the timetable may include a log 41 of communication events, such as missed calls and instant message events from a colleague. A user may scroll through the linear timetable to view past, present, and future communication events. For example, in FIG. 4, a user may scroll to the right to view future communication events, such as meeting for the next day, or scroll to the left to view past communication events, such as meetings the day before.

The processor 21 may cause a default view of the communication events list 30 to be displayed. The default view may be set as a rule. For example, the default view may display present communication events and, if possible, one or more future communication events and one or more past communication events.

The processor 21 may return to a default view after a period of inactivity. For example, if a user scrolls away from the default view (e.g., scrolls to view future communication events), the processor 21 may display the default view after a period of inactivity, such as 5 or 10 minutes.

The processor 21 may generate a database. The database may be a structured collection of records, information, or data that is stored in a computer system, such as the communication device 20. The database may rely upon software to organize the storage of data. The database may be a relational model, hierarchical model, or network model. For example, the processor 21 may generate a database that organizes and stores communication event information. The communication event information may be used to generate a communication event list.

The processor 21 is operable to communicate with the memory 23. Communication with the memory 23 may include reading and/or writing. For example, may process a set of instructions stored in the memory 23. In another example, the processor 21 may cause information to be stored in the memory 23.

The display device 22 is a CRT, monitor, flat panel, a general display, LCD, projector, printer or other now known or later developed display device for outputting information. The display device 23 may display one or more images. For example, the display device 23 may display images, projections, or representations of a workspace. In another example, the display device 23 may display 3D images, projections, or representations.

The display device 22 is operable to display information. The processor 21 is operable to cause information to be displayed on the display device 22. For example, the processor 21 may cause the communication event list 30 to appear on the display device 22. The communication event list 30 may be displayed as a list or timetable. For example, FIG. 3 shows a list of the all the communication events. The list is a global log of all 35 past communication events, present communication events, and future communication events. The communication events list shows communication events for that day. However, as shown on the right side of FIG. 3, a user may scroll up the list to view future communication events or scroll down to view past communication events. Alternatively, the log of past communication events, present communication events, and future communication events may be organized according to the type of communication event (e.g., as shown in FIG. 2) or any other type of grouping.

The display device 22 may display a timetable. The processor 21 may cause a timetable, as shown in FIG. 4, to be displayed. The timetable may include all, some, or none of the information included in the communication event list 30. The timetable is a representation of the communication event list 30 as a function of time and duration. For example, a meeting that begins at 8 am and last for forty-five minutes may be shown on the time table as a time representation. The time representation may include labels, notes, links, documents, or other information related to the communication event.

The memory 23 is a computer readable storage media. The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory 23 may be a single device or a combination of devices. The memory 23 may be adjacent to, part of, networked with and/or remote from the processor 21.

The memory 23 may be a computer readable storage media having stored therein data representing instructions executable by the programmed processor 21 for visually representing a project in a workspace. The memory 23 stores instructions for the processor 21. The processor 21 is programmed with and executes the instructions. The functions, acts, methods or tasks illustrated in the figures or described herein are performed by the programmed processor 21 executing the instructions stored in the memory 23. The functions, acts, methods or tasks are independent of the particular type of instructions set, storage media, processor or processing strategy and may be performed by software, hardware, integrated circuits, firm ware, micro-code and the like, operating alone or in combination. The instructions are for implementing the processes, techniques, methods, or acts described herein.

The computer readable storage media stores data representing instructions executable by a programmed processor, such as processor 21, for visually representing one or more projects in a workspace. The instructions may include identifying communication event information, generating a communication event list, and displaying the communication event list.

The memory 23 is operable to store information. The memory 23 may store communication event information, communication event list information, and communication event database information. Additional, different, or less information may be stored in the memory 23.

Figure 5:
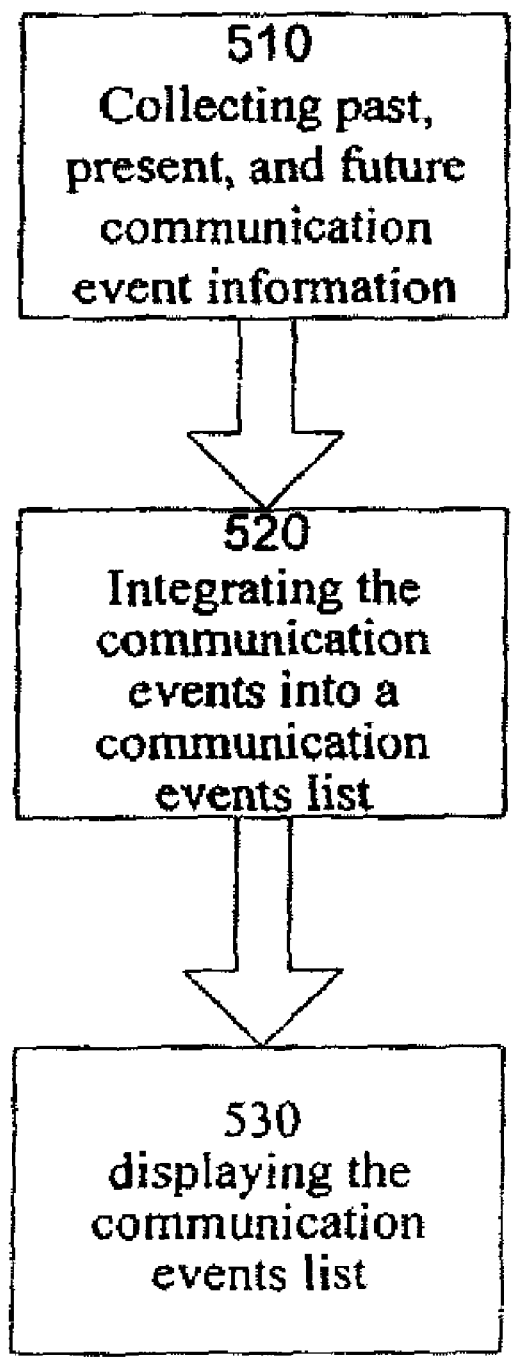
FIG. 5 illustrates one embodiment of a flowchart for displaying a service communication event list.

FIG. 5 shows a method for displaying communication events. The method is implemented using the system 10 of FIG. 1 or a different system. The acts may be performed in the order shown or a different order. The acts may be performed automatically, manually, or the combination thereof.

The method for displaying communication events may include collecting past, present, and future communication event information (510); integrating the past, present, and future communication events into a communication events list (520); and displaying the communication events list, such that past, present, and future communication events may be viewed (530). Additional, different, or fewer acts may be provided. For example, the method may not include act 510. The past, present, and future communication events may already be collected.

In act 510, communication event information is collected. Collecting may include receiving, generating, or retrieving. Information relating to a communication event may be collected from one or more service providers. Past, present, and/or future communication events may be collected.

A communication device may receive communication event information. Receiving may include coming into possession of communication event information. The communication device may act as a receptacle of communication event information. For example, a service device may transmit a communication event to the communication device. The communication device may receive the communication event information.

The communication device may generate communication event information from service applications stored on the communication device. The communication event information may be generated as part of a service application stored on the communication device. For example, the communication device may generate communication event information (e.g., the occurrence or creation of a calendar entry) as part of a calendar application stored on the communication device.

The communication device may generate communication event information based on transmitted communication events. When communication is transmitted from the communication device, the communication device may generate communication event information associated with that particular communication event.

The communication device may retrieve communication event information. The communication device may retrieve communication event information by requesting, searching, extracting, or pulling the communication information from another communication device.

The collected communication information may be stored. The collected past, present, and future communication information may be placed into a database and stored for future use. For example, the collected communication event information may be archived.

In act 520, the communication device may create a communication event list. The communication device may integrate the collected communication event information from one or more service devices. The communication event list may be an integration of service communication event information associated with the communication device. For example, the communication event list is a collection of communication events from all, some, or none of the services, which are associated with the communication device. The communication event list may include past, present, and/or future communication event information.

The communication event list may include one or more descriptions of communication events. The description may be textual or graphical. A description may identify or describe one or more characteristics of the communication event. The descriptions may be used to distinguish each communication event from other communication events. For example, the time that the communication event occurred may be a description.

The one or more descriptions may be automatically or manually generated. A user may input a remark or description of the communication event using an input device. The description may include the user's thoughts, perceptions, conclusions, or other information related to the communication event.

The communication device may organize the descriptions of communication events. Organization of the descriptions may include arranging or grouping. Arranging may include putting the communication events into order or into a suitable sequence, relationship, or adjustment. The communication events may be arranged according to date, name of the person the communication event was received from or sent to, duration, location, or any other category. For example, the communication event list 30 may be arranged in chronological order. For example, the descriptions of communication events may be listed chronologically. Grouping may include placing the communication events according to type, name, subject, date, duration, location, status, notes, any combination thereof, or any now known or later developed grouping technique.

The communication device may search the communications event list. The communication device may be used to locate information in the communication event list. For example, the communication device may be used to locate text, keywords, graphics, or documents. The communication device may search according to labels or descriptions.

In act 530, the communication event list may be displayed. The communication event list may be displayed as an image on a display device. The communication event list may be a part of a workspace. The communication event list may be displayed as a list, timetable, pie chart, or any other chart or presentation. For example, the communication event list may display past, present, and future communication events in a list.

The displayed communication event list may be interactive. For example, the communication device may search the communication event list, scroll through the communication event list, or use the communication event list to access information associated with a communication event.

The communication device may be used to search the communication event list. Searching may include searching for text or a graphic. The text or graphic may be located within or attached to the communication event list. Alternatively, the text or graphic may be linked to or associated with the communication event list. A lexical, list, graph, tree, or string search algorithm may be used to locate the text or graphic.

The communication device may search within the descriptions under each label, within the documents or links associated with the communication event, within a note or remark, or anywhere else related to the communication event list. Searching may include matching. Keywords may be matched. For example, a note or remark associated with a communication event may be searched.

The communication device may be used to scroll through the communication event list. A user may use a scroll bar to scroll through past, present, and future communication events in the communication event list.

The communication device may be used to access information associated with a communication event. A user may access information associated with a communication event by following a link or pathway provided in the communication event list. The link or pathway may lead the user to the associated information. Alternatively, a user may access documents attached to or integrated with the communication event list.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A method for displaying communication events at a communication device, the method comprising:
   communicating with a plurality of communication servers;
   collecting, from a first of the plurality of communication servers, a first present communication event that is currently taking place, and a future communication event that has been scheduled to take place;

collecting, from a second of the plurality of communication servers, a past communication event that has already taken place, and a second present communication event that is currently taking place, where a communication device performs the collecting;

combining the first present communication event, and the future communication event, from the first of the plurality of communication servers, and the past communication event and the second present communication event, from the second of the plurality of communication servers, into a communication events list, where the communication device performs the combining;

displaying the communication events list, such that the past communication event, the first present communication event, the second present communication event, and the future communication event are viewed simultaneously, where the communication events list is displayed on the communication device, wherein the communication events list comprises a first link for the first present communication event configured to initiate a voice over internet protocol call and a second link for the second present communication event configured to allow a user to join a meeting, wherein communication events in the communication events list are associated graphically, where a conversation that began from a first communication service is shown as a past communication event and is indicated in the display device as being continued into a collaboration session from a second communication service currently active as a present communication event;

receiving a new communication event after the communication events list has been displayed; and updating the communication events list with the new communication event.

2. The method as claimed in claim 1, wherein the communication events list is displayed in chronological order, and wherein the communication events include two or more of a telephone call, electronic mail message, instant message, short text message, video message, voice message, meeting, and calendar event.

3. The method as claimed in claim 1, wherein displaying the communication events list includes displaying the communication events list on a second communication device, such that past, present, and future communication events may be viewed on the second communication device.

4. The method as claimed in claim 1, wherein the communication event list includes a pathway to a communication service.

5. The method as claimed in claim 1, comprising:
scrolling through the communication events list, such that future communication events may be viewed.

6. The method as claimed in claim 1, comprising:
searching the communication events list.

7. The method as claimed in claim 1, wherein the communication device is a first communication device, and wherein the first communication service includes at least one communication service compatible with the first communication device and not compatible with a second communication device.

8. The method as claimed in claim 1, wherein each of the communication events on the communication events list includes a indication of whether the communication event was transmitted or received and an identity of the communication service associated with the communication event.

9. The method as claimed in claim 1, wherein when the future communication event becomes active or pending, the communication device provides a link for a user to join an associated meeting and display the meeting on the display device.

10. A communication device for displaying communication events, the communication system comprising:
a display device;
a processor operable to combine communication events from two or more communication services into a communication events list, where the communication events include at least one past communication event from each of the two or more communication services, at least one present communication event from each of the two or more communication services, and at least one future communication event;
wherein the communication events list is displayed on the display device, such that communication events are viewable on the display device and associated graphically, where a conversation that began from a first communication service is shown as a past communication event and is indicated in the display device as being continued into a collaboration session from a second communication service currently active as a present communication event,
wherein the processor is configured to provide a first link of the at least one past communication event configured to link to an attached document, a second link of the at least one present communication event configured to initiate a voice over internet protocol call, and a third link of the at least one future communication event configured to allow a user to join a meeting associated with the at least one future communication event and display the meeting on the display device when the at least one future communication event becomes a present communication event.

11. The communication device as claimed in claim 10, wherein the past, present, and future communication events are viewable on the display device by scrolling through the communication events list.

12. The communication device as claimed in claim 11, wherein the at least one present communication event has begun, but has not ended.

13. The communication device as claimed in claim 11, wherein the at least one future communication event has not begun.

14. The communication device as claimed in claim 10, wherein the communication events include a telephone call, electronic mail message, instant message, short text message, video message, voice message, meeting, calendar event, or any combination thereof.

15. The communication device as claimed in claim 14, wherein the communication event list includes a global record of communication from different media used in communication.

16. The communication device as claimed in claim 10, wherein the communication event list includes a textual or graphical description of each of the communication events.

17. The communication device as claimed in claim 16, wherein the textual or graphical description indicates participants of each of the communication events and possible participants of at least one of the communication events.

18. A non-transitory computer readable storage medium with instructions for generating a communication event list, the instructions including:
requesting communication events from two or more communication services;
receiving first past, present, and future communication events from a first communication service;

receiving second past and present communication events from a second communication service, wherein the present communication events include an electronic mail message that is drafted and not sent, and a calendar event;

combining the first past, present, and future communication events from the first communication service and the second past, present, and future communication events from the second communication service into a communication events list, wherein the communication events list comprises a first link for the first present communication event configured to initiate a voice over internet protocol call and a second link for the second present communication event configured to allow a user to join a meeting;

associating communication events in the communication events list graphically such that a conversation that began from a first communication service is shown as a past communication event and indicated as being continued into a collaboration session from a second communication service currently active as a present communication event;

searching the communication events list for a keyword; and displaying the electronic mail message or the calendar event according to the keyword.

19. The computer readable storage medium of claim 18, wherein when the future communication event becomes active or pending, the communication device provides a link for a user to join an associated meeting and display the meeting on the display device.

* * * * *